United States Patent [19]

Avar

[11] Patent Number: 4,780,492

[45] Date of Patent: Oct. 25, 1988

[54] CONCENTRATED SOLUTIONS OF U.V. STABILIZERS

[75] Inventor: Lajos Avar, Biel-Benken, Switzerland

[73] Assignee: Sandoz Ltd., Basel, Switzerland

[21] Appl. No.: 945,419

[22] Filed: Dec. 22, 1986

Related U.S. Application Data

[63] Continuation of Ser. No. 848,594, Apr. 7, 1986, abandoned, which is a continuation of Ser. No. 591,475, Mar. 20, 1984, abandoned.

[30] Foreign Application Priority Data

Mar. 21, 1983 [DE] Fed. Rep. of Germany ....... 3310169

[51] Int. Cl.$^4$ .................... C08K 5/34; C23G 5/00; C07C 143/90
[52] U.S. Cl. .................... 524/99; 252/364; 252/401; 252/402; 252/403; 252/407; 428/416; 428/425.8; 428/457; 428/458; 428/460; 428/461; 524/102; 524/103; 524/220; 524/222; 524/223; 524/254; 524/315; 524/361; 524/364; 524/378; 524/721; 524/728
[58] Field of Search ............. 252/401, 402, 403, 407, 252/364; 524/97, 99, 102, 103, 222, 220, 223, 259, 315, 361, 364, 378, 721, 728; 428/416, 425.8, 457, 458, 460, 461

[56] References Cited

U.S. PATENT DOCUMENTS

| | | | |
|---|---|---|---|
| 3,904,581 | 9/1975 | Murayama et al. | 524/103 |
| 4,021,432 | 5/1977 | Holt et al. | 546/180 |
| 4,314,933 | 2/1982 | Berner | 524/103 |
| 4,408,051 | 10/1983 | Hinsken et al. | 524/99 |
| 4,412,024 | 10/1983 | Avar et al. | 524/220 |
| 4,426,472 | 1/1984 | Berner | 524/103 |
| 4,524,165 | 6/1985 | Musser et al. | 524/220 |
| 4,525,504 | 6/1985 | Morris et al. | 524/220 |

Primary Examiner—John Kight
Assistant Examiner—Kriellion Morgan
Attorney, Agent, or Firm—Gerald D. Sharkin; Richard E. Vila; Thomas C. Doyle

[57] ABSTRACT

A liquid concentrate comprising an oxamide and a 2,2,6,6-tetraalkylpiperidine compound dissolved in an organic solvent is useful for the UV-stabilization of hardenable liquid finishes, particularly automotive finishes.

34 Claims, No Drawings

CONCENTRATED SOLUTIONS OF U.V. STABILIZERS

This is a continuation of application Ser. No. 848,594, filed Apr. 7, 1986, now abandoned, which in turn is a continuation of application Ser. No. 591,475, filed Mar. 20, 1984, now abandoned.

The invention relates to liquid compositions containing UV-stabilisers, particularly for use in hardenable liquid finishes such as paints, enamels and automotive finishes.

Addition of UV-stabilisers to liquid finishes is difficult because of the low solubility of most such stabilisers in the liquid finish. The stabilisers must generally be pre-dissolved in large quantities of solvent, which is time-consuming and uneconomic, particularly as the leads to the liquid finish containing excessive amounts of solvent, which must finally be removed again. The use of solid stabilisers in powder form, on the other hand, gives rise to dust problems, and uneven distribution of stabilisers or even undissolved solid particles in the product.

It has now been found that mixtures of selected oxalic acid diamides with sterically hindered amines have extremely high solubility in organic solvents and liquid finishes, and allow the preparation of liquid concentrates which can be added volumetrically to the finish without the use of large quantities of solvent. Such liquid concentrates remain liquid at low temperatures, and so are unaffected by climatic changes. By the use of water-miscible organic solvents, liquid concentrates may be obtained which are also compatible with water-based liquid finishes such as emulsion paints.

Accordingly, the invention provides a liquid concentrate comprising (a) at least one oxamide of formula I

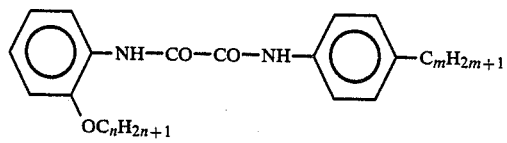

in which
n is 1 or 2 and
m is 8-18
and (b) at least one 2,2,6,6-tetraalkylpiperidine compound having a solubility in xylene of at least 10% by weight at 25° C. dissolved in (c) an organic solvent or solvent mixture the concentration of (a)+(b) in the total composition being at least 40% by weight.

In the compounds of formula I, n is preferably 2 and m is preferably 10-14, more preferably 12. Preferably the $C_{8-18}$alkyl group is branched, and more preferably is a mixture of isomeric branched alkyl groups. The preferred compound of formula I is 2-ethoxy-4'-isododecyl oxalic acid dianilide in which the isododecyl group is a mixture of isomers. Compounds of formula I are known.

Preferred 2,2,6,6-tetraalkylpiperidine compounds are those containing the basic structure:

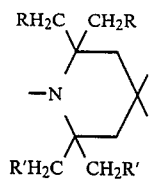

in which R and R' are independently hydrogen or methyl, or both R's or both R'3 s together form the group $-(CH_2)_3-$. Preferably R and R' are all hydrogen.

One group of preferred compounds (b) are those in which the sterically hindered nitrogen atom carries a $C_{1-22}$alkyl group linked to the nitrogen either directly or through a carbonyl group. A further group of preferred compounds (b) are those in which a $C_{1-22}$alkyl, preferably $C_{4-12}$alkyl group, is present elsewhere in the molecule.

Such compounds are known and are described for example in European Patent Applications Nos. 2753 and 16723 and respective corresponding U.S. Pat. Nos. 4,426,472 and 4,314,933. A particular group of preferred compounds (IIe) is that defined in claim 1 of British Patent Application No. 2 089 800A and at column 1, lines 7-59 of corresponding U.S. Pat. No. 4,408,051, incorporated herein by reference, more preferred subgroups of which are defined in claims 2-12 of the above application and at column 1, line 65 to column 3, line 33 and examples 1 to 7 of corresponding U.S. Pat. No. 4,408,051. A particular preferred compound of this group is that of formula (1).

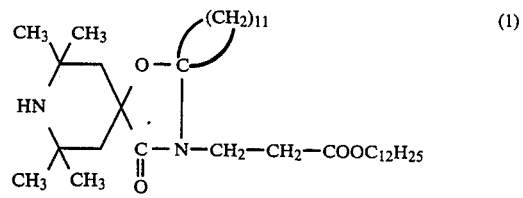

A further group of preferred compounds is that of formula IIa $$\left[ \begin{array}{c} CH_3 \quad CH_3 \\ R_3-N \underset{CH_3 \quad CH_3}{\bigvee} O-R_4 \end{array} \right]_8 \quad \text{IIa}$$

in which
$R_3$ is hydrogen, $C_{1-14}$alkyl or ($C_{1-14}$alkyl)carbonyl; 8 is an integer from 1 to 4 inclusive
and $R_4$, when $8=1$, is $C_{1-22}$alkyl, benzyl, ($C_{1-21}$alkyl)-carbonyl, phenyl carbonyl, ($C_{5-6}$cycloalkyl)carbonyl, ($C_{1-4}$alkyl-$C_{5-6}$cycloalkyl)carbonyl or phenyl ($C_{1-6}$alkyl)carbonyl, in which any phenyl groups may be substituted by 1 or 2 $C_{1-4}$alkyl groups and/or 1 hydroxyl group;
when q=2, is linear or branched ($C_{2-22}$)alkylene, ($C_{4-12}$)alkenylene, xylylene, or a divalent residue of a saturated or unsaturated aliphatic or aromatic dicarboxylic acid;

when q=3, is a trivalent residue of a saturated aliphatic or an aromatic tricarboxylic acid when q=4, is a 4-valent residue of an aliphatic or aromatic tetracarboxylic acid.

Preferred groups $R_4$ in formula IIa are phenylcarbonyl, p-t-butylphenyl, ($C_{15-19}$alkyl)carbonyl, 3,5-di-t-butyl-4-hydroxyphenylethyl and $-CO+CH_2)_8CO-$ $R_3$ is preferably hydrogen, methyl, ethyl or acetyl.

A particularly preferred compound of this group is that of formula (2)

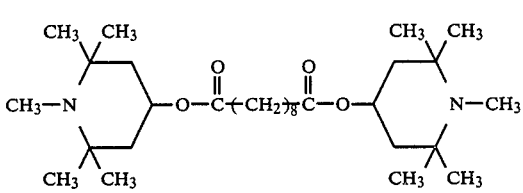

(2)

A further group of preferred compounds is that of formula IIb $$\left[ \begin{array}{c} CH_3 \quad CH_3 \\ R_3-N \diagdown \diagup N \diagdown \diagup R_5 \\ \quad | \\ N-R_6 \\ CH_3 \quad CH_3 \end{array} \right]_n$$

IIb in which $R_3$ is hydrogen, $C_{1-14}$ alkyl or ($C_{1-14}$alkyl)carbonyl;

$R_5$ is hydrogen, $C_{1-12}$ alkyl, phenyl($C_{1-12}$alkyl), ($C_{1-14}$alkyl)carbonyl, substituted or unsubstituted phenylcarbonyl or substituted or unsubstituted phenyl ($C_{1-8}$alkyl)carbonyl n is 1 or 2

$R_6$ when n=1 is $C_{1-12}$ alkyl, $C_{2-12}$ alkenyl, or $C_5$ or $C_6$ cycloalkyl and when n=2 is $C_{2-12}$ alkylene, phenylene or xylylene.

The substitution in the phenyl groups of $R_5$ may be selected from one hydroxyl and one or two $C_{1-8}$ alkyl groups. Preferred substituents are p-t-butyl, p-nonyl and 3,5-di-t-butyl-4-hydroxy.

A further group of preferred compounds is that of formula IIc $$\left[ \begin{array}{c} CH_3 \quad CH_3 \\ R_9-N \diagdown \diagup \quad R_7 \quad O \\ \quad | \quad \| \\ N-CH_2-CH_2-C-X \\ CH_3 \quad CH_3 \end{array} \right]_p - Y$$

IIc in which $R_9$ is hydrogen, $C_{1-18}$alkyl, ($C_{1-21}$alkyl)carbonyl, ($C_{2-19}$alkenyl)carbonyl, phenyl carbonyl, phenyl($C_{1-4}$alkyl)carbonyl, ($C_{1-4}$alkyl)phenyl carbonyl or oxygen $R_7$ has a significance of $R_9$ other than oxygen, X is oxygen, $-NH-$ or $<N(C_{1-4}$alkyl)

p is an integer from 1 to 4 inclusive and

Y is a saturated or unsaturated p-valent aliphatic group which may be interrupted by oxygen or sulphur, or a substituted or unsubstituted aromatic group.

Preferably $R_9$ is hydrogen, $C_{1-4}$alkyl, ($C_{1-12}$alkyl)carbonyl or ($C_{2-12}$alkenyl)carbonyl. More preferably $R_9$ is hydrogen, $C_{1-4}$alkyl or ($C_{1-14}$alkyl)carbonyl. Most preferably $R_9$ is hydrogen, methyl or acetyl.

$R_7$ has the same preferred significances as $R_9$.

X is preferably oxygen.

p is preferably 1, 2 or 4, more preferably 1 or 2.

Y is preferably a p-valent saturated aliphatic group, optionally interrupted by an $-S-$ or $-O-$ atom. When p is 1 then Y is preferably $C_{4-8}$ alkyl, ($C_{1-8}$ alkoxy)$C_{1-12}$ alkyl or $C_{1-6}$hydroxyalkyl. When p=2, Y is preferably $+CH_2)_r$ where r is 2-14, preferably 4, 6, 8, 10 or 12, or $$-CH-CH_2, \quad -CH-(CH_2)_2, \quad -CH_2-C(CH_3)_2-CH_2-,$$
$$\quad | \qquad \qquad | $$
$$CH_3 \qquad \quad CH_3$$

$$\qquad \qquad \qquad \qquad CH_2-CH_3$$
$$\qquad \qquad \qquad \qquad | $$
$$-CH_2-CH(CH_3)-CH_2-, \quad -CH_2-C-CH_2-,$$
$$\qquad \qquad \qquad \qquad | $$
$$\qquad \qquad \qquad \qquad CH_3$$

$+CH_2)_2O+CH_2)_2$ or $+CH_2)_2-S-(CH_2)_2$, more preferably $+CH_2)_{r'}$ where $r'$ is 4, 6 or 8 or $-C_2H_4-O-C_2H_4-$. When p=3, Y is preferably $$\qquad \quad CH_2- \qquad \qquad CH_2-$$
$$\qquad \quad / \qquad \qquad \qquad / $$
$$CH_3-C-CH_2- \quad \text{or} \quad -CH$$
$$\qquad \quad \diagdown \qquad \qquad \qquad \diagdown $$
$$\qquad \quad CH_2- \qquad \qquad CH_2-$$

When p=4, Y is preferably $C(CH_2)_4$.

A further group of preferred compounds is that of formula IId $$\left[ \begin{array}{c} CH_3 \quad CH_3 \quad R_8 \\ \qquad \qquad \qquad | \\ R_3-N \diagdown \diagup \quad N-C=O \\ \qquad \qquad \qquad | \\ \qquad \qquad \qquad C-N-R_6 \\ CH_3 \quad CH_3 \quad \| \\ \qquad \qquad \qquad O \end{array} \right]_n$$

IId in which $R_3$, n and $R_6$ are as defined for IIb above, and $R_8$ is $C_{1-12}$ alkyl preferably methyl or ethyl.

Preferred components (b) are the compounds of groups IIa and IIe, particularly compounds (1) and (2).

The tetraalkylpiperidine compounds (b) may be used in free base or acid addition salt form, or in the form of their metal complexes, particularly nickel complexes. Preferred nickel complexes are mixed complexes of tetraalkylpiperidine and pyrazolone ligands, especially those described in British Patent Application No. 2 091 732 A.

The compounds (b) are preferably liquid or resinous at room temperature (25° C.). They must have a solubility in xylene at this temperature of at least 10% by weight. Surprisingly it is found that in the presence of the oxamides (a), much higher concentrations of (b) may be obtained.

The ratio of component (a) to component (b) in the liquid concentrate of the invention is preferably from 3:1 to 1:1, more preferably approximately 2:1 by wt. The proportion of component (a)+component (b) in the total mixture is preferably at least 70% by weight. Preferred compositions contain 20-30% of organic solvent (c) by weight. Preferred solvents are hydrocarbons e.g. benzene, alkyl benzenes such as toluene or xylene, hexane, octane, cyclohexane and petroleum fractions; alcohols e.g. butanol; ethers; ketones e.g. methyl ethyl ketone and esters e.g. ethyl acetate. Other suitable organic solvents are water-soluble solvents such as polyalkylene oxides and polyalkylene oxide ethers eg. diethylene glycol dimethyl ether. The liquid concentrates containing water-soluble organic solvents are preferred for use with water-based liquid finishes e.g. emulsion paints.

The liquid concentrates of the invention are useful for the protection of polymeric organic materials against the effects of light and weathering. They are particularly useful for stabilisation of polymeric organic materials in the form of coatings such as paints, laquers and enamels, especially for automotive finishes.

Automotive finishes are generally solutions or dispersions of organic polymers or polymer precursors in organic solvents. The majority are stoving finishes, which require the application of heat, generally above 80° C., in order to harden the finish in an acceptable time once it has been applied to the primer-coated metal surface. The effect of this heating may be to accelerate the chemical reaction between polymer precursors in a thermosetting system, or to bring about fusion of particles of a thermoplastic polymer.

Many automotive finishes are metallic finishes, which contain flakes of metal, usually aluminium, in order to provide optical effects due to reflection. Such finishes are often two-coat finishes, in which a clear top coat is applied over a base coat containing the pigment and metal flakes. Such two-coat metallic finishes have particular need of UV stabilizers in the top coat, since the polymer in this coat is not protected by light-absorbing pigments, and it is subjected to almost double the normal amount of radiation because of reflection of light from the lower metallic layer.

The liquid concentrates of the invention are particularly useful in stoving finishes, particularly in the top coat of two-layer metallic finishes.

The liquid concentrates are suitable for use as UV stabilizers in a wide range of liquid finishes, for example those based on combinations of melamine-formaldehyde resins with oil-modified polyester resins, polyacrylate resins with added crosslinkers, or saturated polyesters; or on self-crosslinked polyacrylate or polyacrylate resin copolymerised with styrene.

Further examples are two-component finishes based on an aliphatic or aromatic di-isocyanate and a hydroxy-group-containing polyacrylate, polyester or polyether resin. Thermoplastic polyacrylate resins may also be used, the latter being particularly useful in metallic finishes, as are also polyacrylate resins with added crosslinkers in combination with melamine-formaldehyde resins etherified with butanol and, further, hydroxy-group-containing polyacrylate resins hardened with aliphatic di-isocyanates.

The liquid concentrate may be added to the finish at any stage in its manufacture, and may be rapidly and accurately metered into the liquid finish. The concentration of (a) and (b) together in the cured finish (i.e. in the liquid finish, based on the solids content) is preferably 0.02-5% by weight, more preferably 0.2-3%.

The following Examples illustrate the invention.

EXAMPLE 1

A solution of 20 g 2-ethoxy-4'-i-dodecyl oxalic acid dianilide in 5 g xylene is warmed to 40° C. and 10 g of the compound of formula (2) is added. The mixture is stirred for 20 minutes and cooled to room temperature. A liquid concentrate is obtained which does not crystallise even at −10° C.

EXAMPLE 2

Example 1 is repeated using the compound of formula (1) instead of (2). A similar liquid concentrate is obtained.

EXAMPLE 3

A liquid finish is prepared by mixing the following conventional ingredients:
80.00 parts by weight polyacrylate resin
13.75 parts by weight melamine resin
4.50 parts by weight glycollic acid butyl ester
7.50 parts by weight mixed aromatic solvent, b.p. 186°-212° C.
6.00 parts by weight solvent b.p. 155°-178° C.

To the stirred finish is metered 3.5 parts of the liquid concentrate of Example 1. The UV stabiliser system is fully dissolved in the liquid finish within 1 minute.

EXAMPLE 4

Example 3 is repeated using the liquid concentrate of Example 2. Similar results are obtained.

EXAMPLE 5

Example 1 is repeated using ethylene glycol dimethyl ether in place of xylene. A liquid concentrate is obtained which is compatible with aqueous systems.

EXAMPLE 6

To 100 parts by weight of an aqueous styrene/acrylate polymer dispersion containing 30% wt. solids is added 1 part by weight of the liquid concentrate of Example 5. The concentrate dissolves quickly without affecting the quality of the dispersion.

The compounds of formula IIc above are disclosed in the co-pending U.S. Application Ser. No. 590,506, filed on Mar. 16, 1984, entitled "Improvements in or Relating to Organic Compounds", now abandoned, and in its continuation-in-part Application Ser. No. 712,345, filed Mar. 15, 1985, now U.S. Pat. No. 4,716,187.

The above-mentioned co-pending U.S. Application, British Patent Applications Nos. 2,089,800A and 2,091,732A, and European Patent Applications Nos. 2,753 and 16,723 are incorporated herein by reference.

What is claimed is:
1. A liquid concentrate comprising
(a) at least one oxamide of formula I

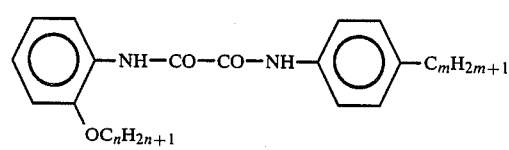

in which
n is 1 or 2 and m is 8–18 and (b) at least one 2,2,6,6-tetraalkylpiperidine compound having a solubility in xylene of at least 10% by weight at 25° C. dissolved in (c) an organic solvent or solvent mixture the concentration of (a)+(b) in the total composition being at least 40% by weight.

2. A liquid concentrate according to claim 1 in which, in the compounds of formula I, the $C_{8-18}$alkyl group is a mixture of isomeric branched alkyl groups.

3. A liquid concentrate according to claim 2 in which the compound of formula I is 2-ethoxy-4'-isododecyl oxalic acid dianilide in which the isododecyl group is a mixture of isomers.

4. A liquid concentrate according to claim 1 in hich the 2,2,6,6-tetraalkylpiperidine compound (b) contains the basic structure

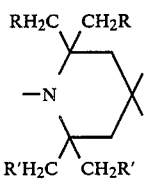

in which R and R' are independently hydrogen or methyl, or both R's or both R"s together form the group $+CH_2)_3$.

5. A liquid concentrate according to claim 4 in which both groups R and both groups R' are hydrogen.

6. A liquid concentrate according to claim 5 in which component (b) is selected from compounds of formulae IIa, IIb, IIc, IId and IIe, which are as follows:

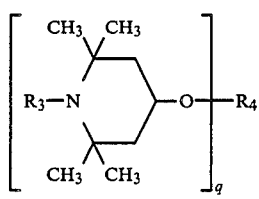

in which
$R_3$ is hydrogen, $C_{1-14}$alkyl or $(C_{1-4}$alkyl$)$carbonyl;
q is an integer from 1 to 4 inclusive and
$R_4$,
when q=1, is $C_{1-22}$alkyl, benzyl, $(C_{1-21}$alkyl$)$carbonyl, phenyl carbonyl, $(C_{5-6}$cycloalkyl$)$carbonyl, $(C_{1-4}$alkyl-$C_{5-6}$cycloalkyl$)$carbonyl or phenyl$(C_{1-6}$alkyl$)$carbonyl, in which any phenyl groups may be substituted by 1 or 2 $C_{1-4}$alkyl groups and/or 1 hydroxyl group;
when q=2, is linear or branched $(C_{2-22})$-alkylene, $(C_{4-12})$alkenylene, xylylene, or a divalent residue of a saturated or unsaturated aliphatic or aromatic dicarboxylic acid;
when q=3, is a trivalent residue of a saturated aliphatic or an aromatic tricarboxylic acid
when q=4, is a tetravalent residue of an aliphatic or aromatic tetracarboxylic acid;

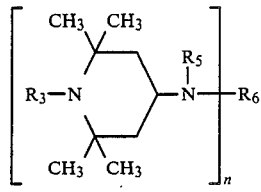

in which
$R_3$ is hydrogen, $C_{1-14}$alkyl or $(C_{1-14}$alkyl$)$carbonyl;
$R_5$ is hydrogen, $C_{1-12}$alkyl, phenyl$(C_{1-12}$alkyl$)$, $(C_{1-14}$alkyl$)$carbonyl, substituted or unsubstituted phenylcarbonyl or substituted or unsubstituted phenyl $(C_{1-8}$alkyl$)$carbonyl
n is 1 or 2
$R_6$
when n=1 is $C_{1-12}$alkyl, $C_{2-12}$alkenyl, or $C_5$ or $C_6$ cycloalkyl and
when n=2 is $C_{2-12}$alkylene, phenylene or xylylene;

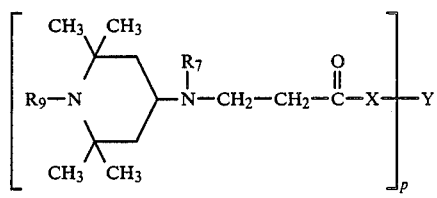

in which
$R_9$ is hydrogen, $C_{1-18}$alkyl, $(C_{1-21}$alkyl$)$carbonyl, $(C_{2-19}$alkenyl$)$carbonyl, phenyl carbonyl, phenyl$(C_{1-4}$alkyl$)$carbonyl, $(C_{1-4}$alkyl$)$phenyl carbonyl or oxygen
$R_7$ has a significance of $R_9$ other than oxygen,
X is oxygen, —NH— or $<N(C_{1-4}$alkyl$)$
p is an integer from 1 to 4 inclusive and
Y is a saturated or unsaturated p-valent aliphatic group which may be interrupted by oxygen or sulphur, or a substituted or unsubstituted aromatic group;

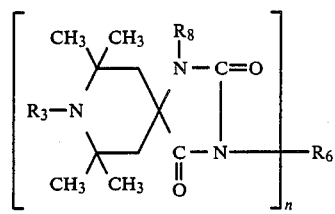

in which $R_3$, n and $R_6$ are as defined for IIb above, and $R_8$ is $C_{1-12}$alkyl;

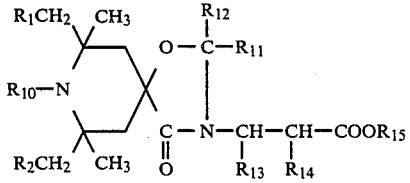

in which
$R_{10}$ is hydrogen or $C_{1-8}$alkyl;

$R_1$ and $R_2$, independently, are hydrogen or $C_{1-4}$alkyl;

$R_{11}$ and $R_{12}$, independently, are hydrogen, $C_{1-30}$alkyl or benzyl; or $R_{11}$ is hydrogen or $C_{1-4}$alkyl and $R_{12}$ is phenyl, ($C_{1-4}$alkyl)-phenyl, chlorophenyl, 4-hydroxy-3,5-t.-butylphenyl or naphthyl; or $R_{11}$ and $R_{12}$ together with the carbon atom to which they are attached form a $C_{5-15}$ cycloalkylidene ring which may be substituted or substituted by one $C_{1-4}$alkyl group, or form a group of formula (a)

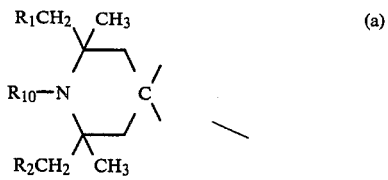

$R_{13}$ is hydrogen, methyl, phenyl or —COO($C_{1-21}$alkyl);

$R_{14}$ is hydrogen or methyl; and $R_{15}$ is hydrogen; a $C_{1-21}$alkyl or $C_{2-21}$alkenyl group which may be unsubstituted or monosubstituted or phenyl or naphthyl and which may be interrupted by oxygen or by a $C_{1-4}$alkylimine group; phenyl; ($C_{1-12}$alkyl)phenyl; $C_{5-12}$cycloalkyl or an aliphatic hydrocarbon residue having 2-20 carbon atoms which may be interrupted by oxygen or by a $C_{1-4}$alkylimine group and which is substituted by 1–3 groups selected from ($C_{1-21}$alkyl)COO— and groups of formula (b)

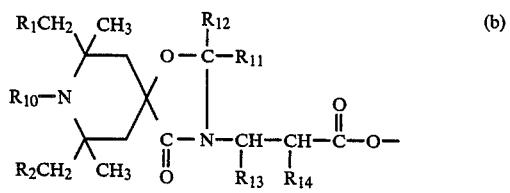

wherein $R_1$, $R_2$, $R_{10}$, $R_{11}$, $R_{12}$, $R_{13}$ and $R_{14}$ are as defined above.

7. A liquid concentrate according to claim 6 in which component (b) is a compound of formula

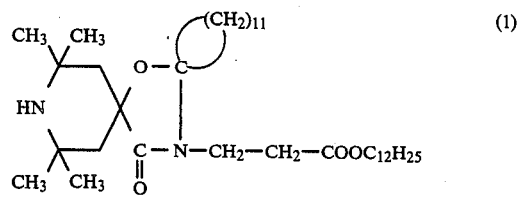

8. A liquid concentrate according to claim 6 in which component (b) is a compound of formula

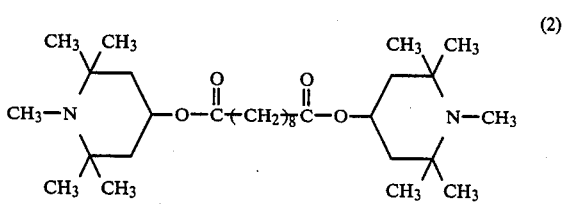

9. A liquid concentrate according to claim 1 in which component (b) is liquid or resinous at 25° C.

10. A liquid concentrate according to claim 1 in which component (c) is a hydrocarbon, alcohol, ether, ketone or ester.

11. A liquid concentrate according to claim 1 in which component (c) is a water soluble polyalkylene oxide or polyalkylene oxide ether.

12. A liquid concentrate according to claim 1 in which the ratio of component (a) to component (b) is from 3:1 to 1:1 by weight.

13. A liquid concentrate according to claim 1 in which the quantity of component (c) is 20–30% by weight of the composition.

14. A process for UV-stabilisation of a hardenable liquid finish comprising the step of adding to the liquid finish a liquid concentrate according to claim 1.

15. A process for UV stabilisation of a water-soluble hardenable liquid finish comprising the step of adding to the liquid finish a liquid concentrate according to claim 11.

16. A liquid concentrate according to claim 4 in which, in the compounds of formula I, the $C_{8-18}$alkyl group is a mixture of isomeric branched alkyl groups.

17. A liquid concentrate according to claim 6 in which, in the compounds of formula I, the $C_{8-18}$alkyl group is a mixture of isomeric branched alkyl groups.

18. A liquid concentrate according to claim 6 in which the compound of formula I is 2-ethoxy-4'-isododecyl oxalic acid dianilide in which the isododecyl group is a mixture of isomers.

19. A liquid concentrate according to claim 7 in which the compound of formula I is 2-ethoxy-4'- isododecyl oxalic acid dianilide in which the isododecyl group is a mixture of isomers.

20. A liquid concentrate according to claim 16 in which the ratio of component (a) to component (b) is from 3:1 to 1:1, by weight.

21. A liquid concentrate acording to claim 18 in which the ratio of component (a) to component (b) is from 3:1 to 1:1, by weight.

22. A liquid concentrate according to claim 8 in which the compound of formula I is 2-ethoxy-4'-isododecyl oxalic acid dianilide in which the isododecyl group is a mixture of isomers.

23. A liquid concentrate according to claim 6 in which component (b) is a compound of formula IIa.

24. A liquid concentrate according to claim 6 in which component (b) is a compound of formula IIe.

25. A liquid concentrate according to claim 6 in which in formula IIb any substituent on the phenyl of phenylcarbonyl or phenyl ($C_{1-8}$alkyl)carbonyl as $R_5$ is selected from one hydroxy group and one or two $C_{1-8}$alkyl groups; and in formula IIc, when p is 1, Y is $C_{4-8}$alkyl, ($C_{1-8}$alkoxy)$C_{1-12}$alkyl or $C_{1-6}$hydroxyalkyl; when p=2, Y is $+CH_2+_r$ where r is 2-14,

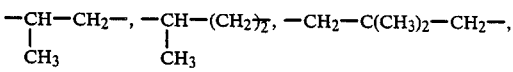

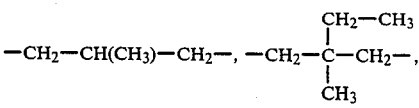

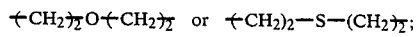

when p=3, Y is

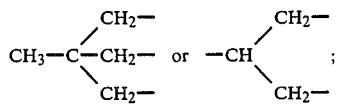

and when p=4, Y is $C(CH_2)_4$.

26. A liquid concentrate according to claim 22 in which, in the compound of formula IIa, $R_3$ is hydrogen, methyl, ethyl or acetyl and $R_4$ is phenylcarbonyl, p-t-butylphenyl, ($C_{15-19}$alkyl)carbonyl, 3,5-di-t-butyl-4-hydroxyphenylethyl or $-CO-CH_2)_8CO-$.

27. A liquid concentrate according to claim 22 in which, in the compounds of formula I, the $C_{8-18}$alkyl group is a mixture of isomeric branched alkyl groups and the ratio of component (a) to component (b) is from 3:1 to 1:1, by weight.

28. A liquid concentrate according to claim 23 in which, in the compounds of formula I, the $C_{8-18}$alkyl group is a mixture of isomeric branched alkyl groups and the ratio of component (a) to component (b) is from 3:1 to 1:1, by weight.

29. A liquid concentrate according to claim 24 in which, in the compounds of formula I, the $C_{8-18}$alkyl group is a mixture of isomeric branched alkyl groups and the ratio of component (a) to component (b) is from 3:1 to 1:1, by weight.

30. A liquid concentrate according to claim 19 in which component (c) is a hydrocarbon, alcohol, ether, ketone or ester.

31. A liquid concentrate according to claim 20 in which component (c) is a water-soluble polyalkylene oxide or polyalkylene oxide ether.

32. A liquid concentrate according to claim 26 in which component (c) is a water-soluble polyalkylene oxide or polyalkylene oxide ether.

33. A liquid concentrate according to claim 27 in which component (c) is a water-soluble polyalkylene oxide or polyalkylene oxide ether.

34. A liquid concentrate according to claim 28 in which component (c) is a water-soluble polyalkylene oxide or polyalkylene oxide ether.

* * * * *